(12) United States Patent
Takamiya (10) Patent No.: US 11,704,013 B2
(45) Date of Patent: *Jul. 18, 2023

(54) APPARATUS, METHOD, AND MEDIUM FOR SCROLLING TEXT

(71) Applicant: CANON KABUSHIKI KAISHA, Tokyo (JP)

(72) Inventor: Hiroyoshi Takamiya, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/239,049

(22) Filed: Apr. 23, 2021

(65) Prior Publication Data

US 2021/0240323 A1 Aug. 5, 2021

Related U.S. Application Data

(63) Continuation of application No. 14/563,651, filed on Dec. 8, 2014, now Pat. No. 11,016,652.

(30) Foreign Application Priority Data

Dec. 10, 2013 (JP) ................................ 2013-255210

(51) Int. Cl.
*G06F 3/0485* (2022.01)
*G06F 3/0488* (2022.01)

(52) U.S. Cl.
CPC .......... *G06F 3/0485* (2013.01); *G06F 3/0488* (2013.01)

(58) Field of Classification Search
CPC .. G06F 3/0485; G06F 3/0482; G06F 3/04883; G06F 3/0488
See application file for complete search history.

(56) References Cited

U.S. PATENT DOCUMENTS 6,690,387 B2 2/2004 Zimmerman
7,061,474 B2 10/2006 Hinckley
(Continued)

FOREIGN PATENT DOCUMENTS

CN 1297178 A 5/2001
CN 1977234 A 6/2007
(Continued)

OTHER PUBLICATIONS

YouTube video by user fordummies, "Getting to Know the iPod Classic and iPod Nano Controls for Dummies," published Nov. 19, 2009, downloaded from https://www.youtube.com/watch?v=L2-5fTttt_c&t=97s (Year: 2009).*
(Continued)

*Primary Examiner* — Eric J Yoon
(74) *Attorney, Agent, or Firm* — Canon U.S.A., Inc., IP Division (57) ABSTRACT

An information processing apparatus having a touch panel display includes a detection unit configured to detect a touch operation performed by a user on the touch panel display, and a display control unit configured to, when the detection unit detects that an object has touched a predetermined region and further detects that the object touching the predetermined region has separated therefrom, control a display to shift to a screen associated with the predetermined region. Further, the display control unit is configured to, during a period from when the object has touched the predetermined region until when the object has separated therefrom, display a text string on the predetermined region of the touch panel display, and scroll-display a text string on the predetermined region if the text string exceeds a number of characters displayable at a time on the predetermined region.

17 Claims, 8 Drawing Sheets

(56) References Cited

U.S. PATENT DOCUMENTS

| | | | |
|---|---|---|---|
| 8,347,232 B1 | 1/2013 | Prud'hommeaux | |
| 2004/0140964 A1 | 7/2004 | Hinckley | |
| 2006/0123357 A1* | 6/2006 | Okamura | G06F 3/0482 715/786 |
| 2006/0242596 A1 | 10/2006 | Armstrong | |
| 2007/0097025 A1 | 5/2007 | Itoh | |
| 2010/0275151 A1 | 10/2010 | Arakane | |
| 2010/0321411 A1 | 12/2010 | Paek | |
| 2011/0225492 A1 | 9/2011 | Boettcher | |
| 2013/0229370 A1* | 9/2013 | Shimizu | G06F 3/0416 345/173 |
| 2014/0013216 A1 | 1/2014 | Sakuta | |
| 2014/0164984 A1 | 6/2014 | Farouki | |
| 2015/0022558 A1 | 1/2015 | Li | |
| 2016/0004339 A1* | 1/2016 | Koara | G06F 3/03548 345/173 |

FOREIGN PATENT DOCUMENTS

| | | |
|---|---|---|
| CN | 101064177 A | 10/2007 |
| CN | 101256468 A | 9/2008 |
| CN | 101593081 A | 12/2009 |
| CN | 102196210 A | 9/2011 |
| CN | 102298596 A | 12/2011 |
| CN | 102609228 A | 7/2012 |
| CN | 102750068 A | 10/2012 |
| JP | H05-173710 A | 7/1993 |
| JP | 2002-373057 A | 12/2002 |
| JP | 37323393 B2 | 12/2005 |
| JP | 2006-126503 A | 5/2006 |
| JP | 2006-330283 A | 12/2006 |
| JP | 2010-257374 A | 11/2010 |
| JP | 4658687 B2 | 3/2011 |
| JP | 2012-116109 A | 6/2012 |
| JP | 2012-221278 A | 11/2012 |
| JP | 2013-097763 A | 5/2013 |
| JP | 2013-114266 A | 6/2013 |
| WO | 2010032598 A1 | 3/2010 |

OTHER PUBLICATIONS

YouTube video by user appleitouchipodz, "how to customize page scrolling on ipod touch, iphone, ipad (barrel)", published Dec. 26, 2010, downloaded from https://youtube.com/watch?v=SvfQJa10vSs (Year: 2010).

\* cited by examiner

APPARATUS, METHOD, AND MEDIUM FOR SCROLLING TEXT

CROSS-REFERENCE TO RELATED APPLICATIONS

This application is a Continuation of U.S. application Ser. No. 14/563,651 filed Dec. 8, 2014, which claims the benefit of priority from Japanese Patent Application No. 2013-255210, filed Dec. 10, 2013, each of which is hereby incorporated by reference herein in its entirety.

BACKGROUND OF THE INVENTION

Field of the Invention

The present disclosure generally relates to information processing and, more particularly, to an information processing apparatus having a touch panel display, a method for controlling the information processing apparatus, and a storage medium therefor.

Description of the Related Art

In recent years, an image forming apparatus having a touch panel, which is mainly supplied as a high-priced product, has been commonly used. On the other hand, from a cost-conscious point of view, an image forming apparatus without a touch panel, which enables a user to move a cursor with a cursor key and select an item with a determination key, has been mainly supplied as a low-priced product represented by a small-size image forming apparatus. Recently, because the touch panel has been increasingly introduced to various devices such as a smartphone, introduction of the touch panel to an operation unit of the low-priced image forming apparatus has been taken into consideration.

On the other hand, an operation unit with a small-size screen is likely to be employed for the low-priced image forming apparatus. When a status of the image forming apparatus is to be displayed by the operation unit with a small-size screen, a number of characters displayable at a time is restricted. A "scrolling text" display is employed as a method for notifying a user of a text string (message) that cannot be displayed at a time on a display region of the screen. In the "scrolling text" display, when a cursor is not focused, a text string is displayed up to the end of the screen, whereas when the cursor is focused, the entire text string can be viewed by scrolling the text string in a row direction.

Japanese Patent Application Laid-Open No. 5-173710 discusses a method which causes a specific region of a touch panel within a screen to operate as an alternative of a cursor key by providing a function of moving as a cursor to the specific region.

However, when the touch panel is employed for the operation unit with a small-size screen, the conventional scrolling text display method cannot be employed because the cursor does not exist therein.

SUMMARY OF THE INVENTION

The present disclosure is directed to an information processing apparatus having a touch panel display capable of executing scrolling text display of a specific item.

According to an aspect of the present disclosure, an information processing apparatus having a touch panel display includes a detection unit configured to detect a touch operation performed by a user on the touch panel display, and a display control unit configured to, when the detection unit detects that an object has touched a predetermined region and further detects that the object touching the predetermined region has separated therefrom, control a display to shift to a screen associated with the predetermined region. Further, the display control unit is configured to, during a period from when the object has touched the predetermined region until when the object has separated therefrom, display a text string on the predetermined region of the touch panel display, and scroll-display a text string on the predetermined region if the text string exceeds a number of characters displayable at a time on the predetermined region.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings.

Figure 1:
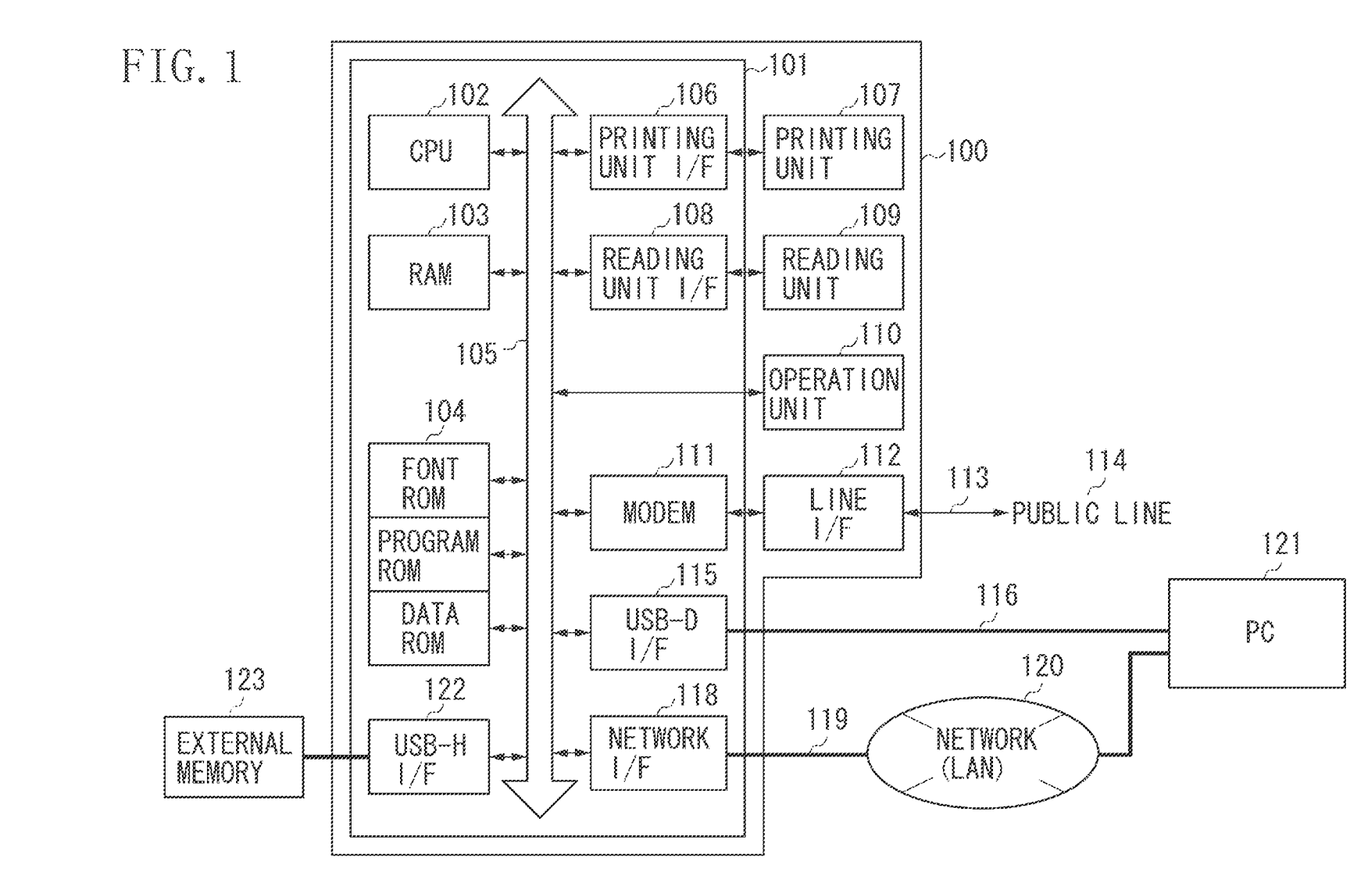
FIG. 1 is a block diagram illustrating a configuration of an image forming apparatus according to a first exemplary embodiment of the present disclosure.

FIG. 1 is a block diagram illustrating a hardware configuration of an image forming apparatus 100 according to a first exemplary embodiment of the present disclosure. Each block represents a module, and an arrow between the blocks indicates a flow of data or instructions.

The image forming apparatus 100 is comprised of a printing unit 107, a reading unit 109, an operation unit 110, a line interface (I/F) 112, and a controller unit 101 for controlling these units. As used herein, the term "unit" generally refers to any combination of software, firmware, hardware, or other component that is used to effectuate a purpose.

The controller unit 101 includes a central processing unit (CPU) 102, a random access memory (RAM) 103, a read only memory (ROM) 104, a printing unit I/F 106, a reading unit I/F 108, a modulator-demodulator (MODEM) 111, a universal serial bus drive (USB-D) I/F 115, a network I/F 118, and a universal serial bus hub (USB-H) I/F 122. Each of the blocks is connected to a system bus 105.

The CPU 102 comprehensively controls the above-described blocks according to various control programs. The CPU 102 reads and executes the various control programs stored in a program region of the ROM 104. Alternatively, the CPU 102 executes the control programs by decompressing the compressed data stored in the program region of the ROM 104 and loading the decompressed data into the RAM 103. The above-described various control programs may be stored in a hard disk drive (HDD) (not illustrated) in a compressed or an uncompressed state.

The network I/F 118 executes communication processing with a host computer 121 (which is illustrated as "PC 121" in FIG. 1 and hereinafter referred to as "PC 121") via a network (local area network (LAN)) 120. The network I/F 118 and the network 120 are connected to each other via a wireless LAN or a communication cable such as a LAN cable 119. The PC 121 can also be connected to the image forming apparatus 100 through the USB-D I/F 115 using a USB cable 116. The MODEM 111 is connected to a public line 114 via the line I/F 112, and executes communication processing with another image forming apparatus, a facsimile apparatus, and a telephone, which are not illustrated. Generally, the line I/F 112 and the public line 114 are connected to each other via a telephone line 113. The USB-H I/F 122 is directly connected to an external memory 123.

The printing unit I/F 106 serves as an interface for outputting an image signal to the printing unit 107 (i.e., printer engine). Further, the reading unit I/F 108 serves as an interface for receiving a read image signal from the reading unit 109 (i.e., scanner engine). The CPU 102 processes the image signal input by the reading unit I/F 108, and outputs the processed image signal to the printing unit I/F 106 as a recorded image signal.

The operation unit 110 is comprised of an input portion and a display portion which are not illustrated. The input portion receives a user operation, generates a control signal according to the operation, and supplies the control signal to the CPU 102. For example, the input portion includes a touch panel that serves as an input device for receiving the user operation. The touch panel is an input device for outputting coordinate information according to a touched position of the input portion configured in a planar state. Based on the control signal generated and supplied by the input portion according to the user operation executed on the input device, the CPU 102 controls the respective units of the image forming apparatus 100 according to the program. Through the above control processing, the CPU 102 can cause the image forming apparatus 100 to operate according to the user operation.

The CPU 102 executes display control of characters and symbols on the display portion of the operation unit 110 by using font information stored in a font region of the ROM 104, and receives instruction information from the input portion of the operation unit 110.

Further, the CPU 102 stores apparatus information of the image forming apparatus 100, phonebook information of the user, and divisional management information in a data region of the ROM 104, so that the CPU 102 reads and updates the above-described information as necessary.

In the block diagram of FIG. 1, a configuration in which the reading unit 109 and the printing unit 107 are included in the image forming apparatus 100 has been described. However, either or both of the units may be provided externally.

Figure 2:
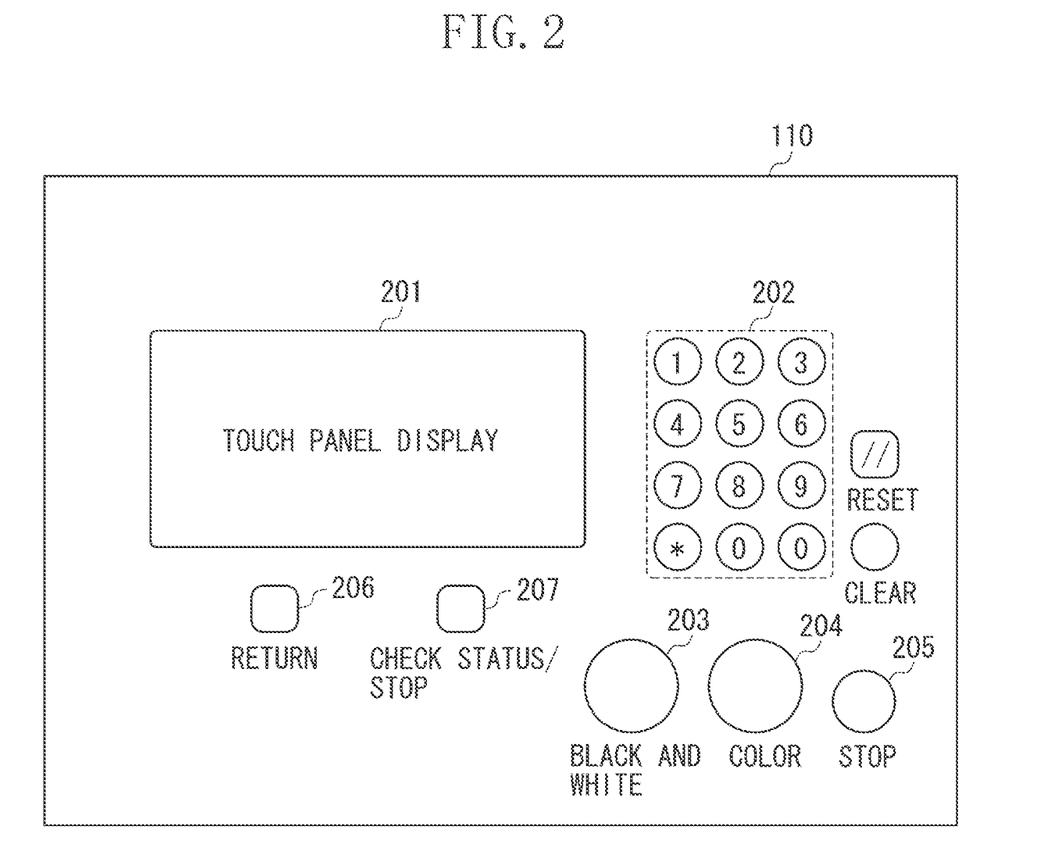
FIG. 2 is a diagram illustrating an operation unit according to the first exemplary embodiment of the present disclosure.

FIG. 2 is a diagram illustrating the operation unit 110 of the image forming apparatus 100 according to the present exemplary embodiment. The image forming apparatus 100 according to the present exemplary embodiment includes various functions such as a copy function using the above-described reading unit 109 and the printing unit 107, a scan function using the reading unit 109 and the USB-D I/F 115, and a facsimile function using the MODEM 111. Further, the image forming apparatus 100 also includes a function of executing printing in response to receiving an instruction from the PC 121 via the USB cable 116 or the network 120, and a function of printing an image stored in the external memory 123.

The operation unit 110 will be described below. A touch panel display 201 is configured in such a manner that a touch panel is superimposed onto a liquid crystal display (LCD) device (display portion) that can display a bitmap.

The CPU 102 can detect the following touch operations executed on the touch panel and a status thereof. For example, the touch operations include an operation in which a user touches the touch panel with his/her finger or a pen (hereinafter, referred to as "tap-in" (touch-down)), an operation in which a user keeps touching the touch panel with his/her finger or a pen without moving the finger or the pen (hereinafter, referred to as "long-tap" (touch-on)), an operation in which a user moves his/her finger or a pen while touching the touch panel (hereinafter, referred to as "drag"), and an operation in which a user removes his/her finger or a pen from the touch panel (hereinafter, referred to as "tap-out" (touch-out)). The CPU 102 is periodically notified of the above-described touch operations and positional coordinates via the system bus 105, so that the CPU 102 determines, based on the notification, what kind of touch operation has been executed on the touch panel. The CPU 102 can also determine, based on the change in positional coordinates, a direction in which the finger or the pen moves on the touch panel at each of a vertical component and a horizontal component thereon.

For the touch panel, various types of touch panels such as a resistive film type, a capacitance type, a surface acoustic wave type, an infrared type, an electromagnetic induction type, an image recognition type, and an optical sensor type may be used.

A numerical keypad 202 allows a user to input the number of copies or a phone number for a facsimile function. A black and white start key 203 and a color start key 204 are used to instruct the image forming apparatus 100 to start copying, scanning, or sending facsimiles. In addition, those start keys may not have to be individually provided on an image forming apparatus if the apparatus includes a function capable of determining whether a document is color or black-and-white when the document has been read.

A stop key 205 is used to input instructions for stopping the operations of various functions such as a printing function. A return key 206 is used to input an instruction for cancelling the current setting and returning to the previous screen. A check status/stop key 207 is used to display a screen for checking a status of the processes currently executed by the image forming apparatus 100, so as to allow a user to select and stop a process the user desires to stop among the processes.

Figure 3A:
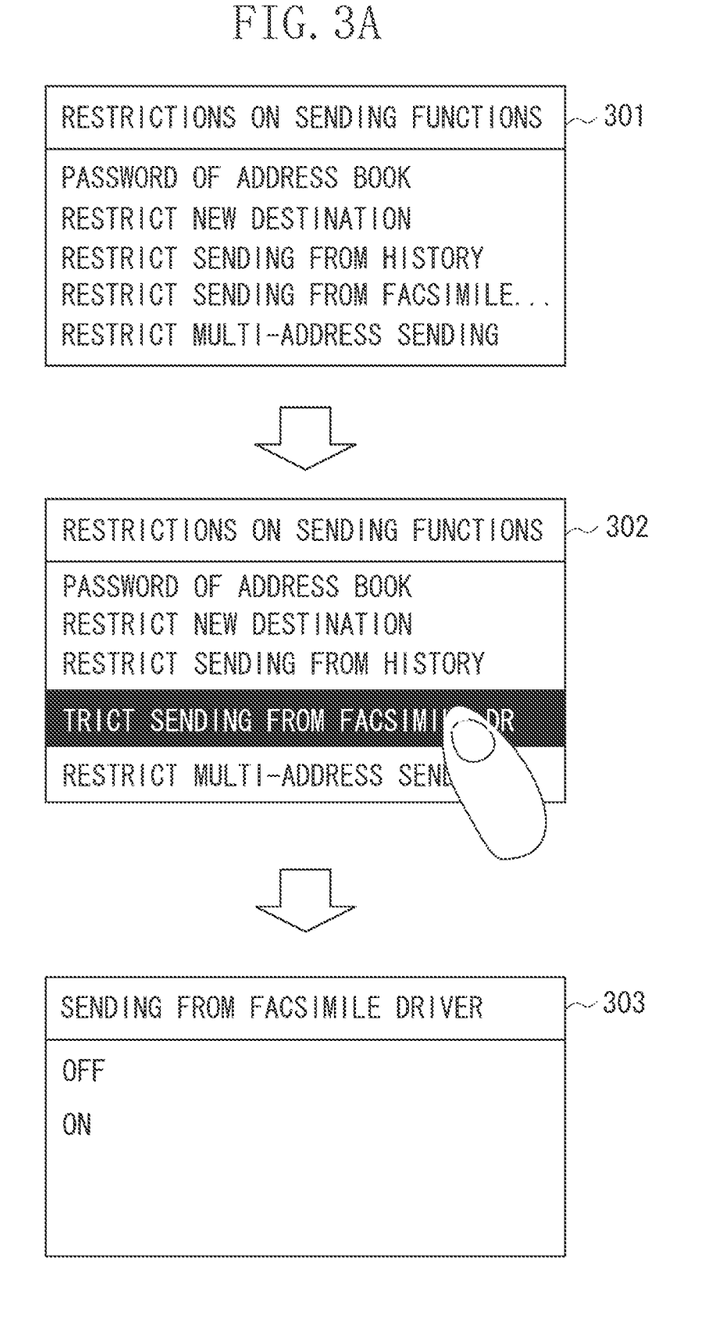
FIGS. 3A and 3B are diagrams illustrating scrolling text processing when a touch panel according to the first exemplary embodiment of the present disclosure is operated.

FIG. 3A is a diagram schematically illustrating a flow of shifting a screen according to the present exemplary embodiment.

A screen 301 displays a list of items selectable by the user with respect to "RESTRICTIONS ON SENDING FUNCTIONS" which can be set in the image forming apparatus 100. According to the present exemplary embodiment, a predetermined number of characters (twelve two-byte characters in Japanese, for example) can be displayed for each of the items. In the screen 301, the fourth item from the top of the list is "RESTRICT SENDING FROM FACSIMILE DRIVER", and the entire text string cannot be displayed at a time because the text string exceeds the predetermined number of characters. Therefore, the first predetermined number of characters "RESTRICT SENDING FROM FACSIMILE" are displayed on the screen 301. In a non-scroll mode, to indicate that the entire text string is not displayed thereon, a symbol " . . . " is displayed at the end of the screen. As described above, according to the present exemplary embodiment, a text string exceeding the predetermined number of characters is a text string determined as a scrolling text target.

Figure 3B:
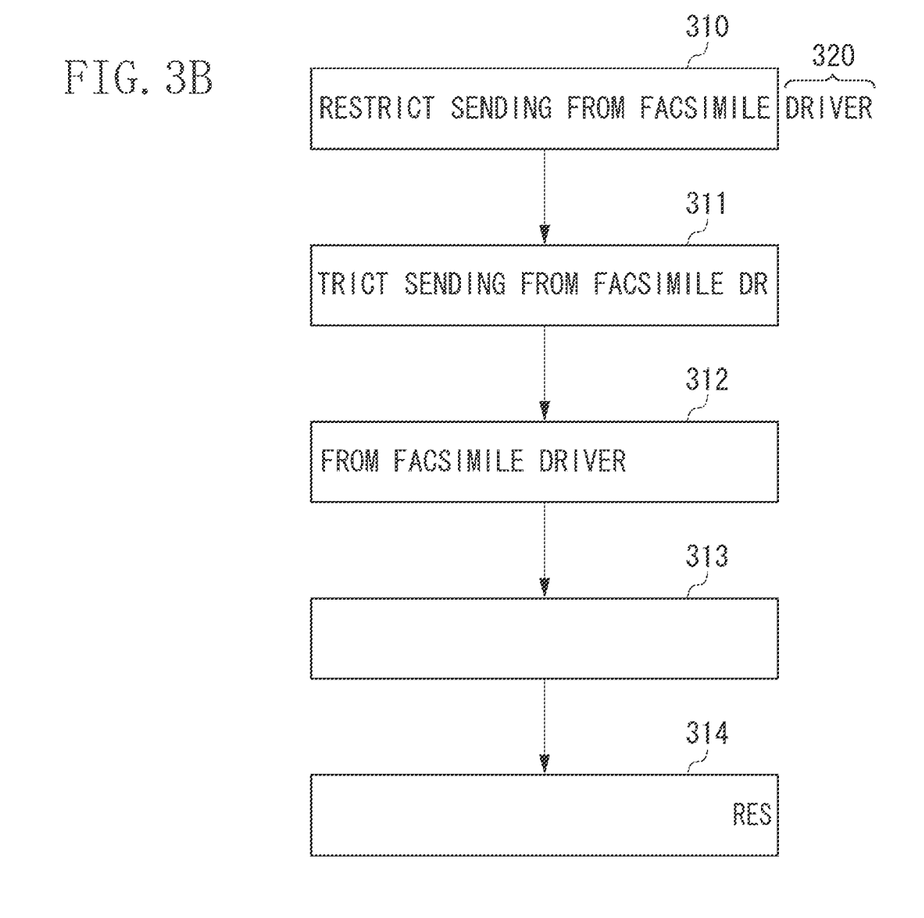

Herein, the scrolling text display method will be described in detail with reference to FIG. 3B.

As described above, out of the text string "RESTRICT SENDING FROM FACSIMILE DRIVER", up to the predetermined number of characters from the top of the text string, i.e., a part of the text string 310, is displayed at the beginning. Because a rest of the text string 320 cannot be displayed together, the CPU 102 displays the entire text string on the display portion by employing the scrolling text display method. The CPU 102 displays the text string by scrolling it from the right to the left as illustrated in display portions 311 and 312. Finally, the text string is no longer displayed as illustrated in a display portion 313. Thereafter, as illustrated in a display portion 314, the text string is repeatedly displayed from the beginning thereof. Through the above-described display control, the user can understand the entire contents of the text string.

A description will be given with reference to FIG. 3A again. A screen 302 illustrates a state where an item corresponding to a text string determined as a scrolling text target has been touched (tapped in). When the item "RESTRICT SENDING FROM FACSIMILE . . . " displayed on the screen 301 is touched, the item is focused (highlighted) thereon, and the scrolling text display of the text string is executed. The screen 302 illustrates a state where the text string has been scrolled by three characters from the state illustrated in the screen 301.

A screen 303 is a screen displayed after the user has removed the finger from the scroll-displayed item (i.e., tapped out) to select the item. According to the present exemplary embodiment, the CPU 102 does not determine the item as a selected item by the user simply tapping in, and thus the CPU 102 does not shift the screen. The CPU 102 determines the item as a selected item and shifts the display to a screen assigned to the item when the user taps out.

Figure 4:
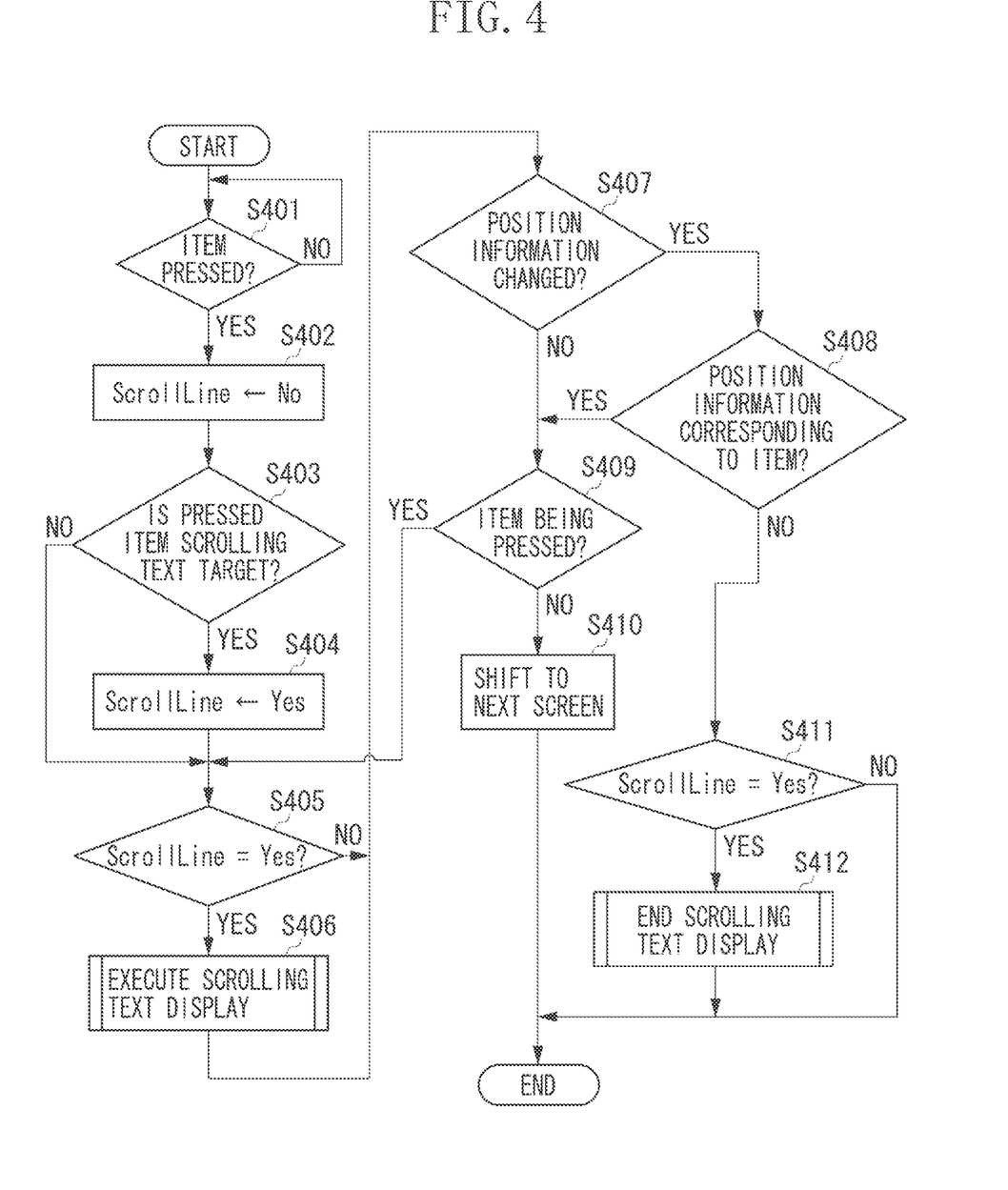
FIG. 4 is a flowchart according to the first exemplary embodiment of the present disclosure.

FIG. 4 is a flowchart of the processing executed by the CPU 102 according to the present exemplary embodiment.

In step S401, the CPU 102 waits until the user presses any of listed items displayed on the display portion. More specifically, in step S401, based on the notification provided through the touch panel, the CPU 102 determines whether a tap-in is detected at a position where the listed items are displayed. In a case where a tap-in is detected on any of the listed items (YES in step S401), the processing proceeds to step S402. In step S402, the CPU 102 focuses the corresponding item, and initializes a scrolling text determination flag "ScrollLine" (i.e., sets "ScrollLine" to "No"). Subsequently, in step S403, the CPU 102 determines whether the tapped in item is a text string determined as a scrolling text target. Herein, a text string exceeding a predetermined number is determined to be the text string determined as a scrolling text target. According to the present exemplary embodiment, if a text string includes a predetermined number of characters (thirteen or more two-byte characters in Japanese, for example), the text string is determined to be a scrolling text target. In a case where the item is the text string determined as the scrolling text target (YES in step S403), the processing proceeds to step S404. In step S404, the CPU 102 sets the scrolling text determination flag "ScrollLine" to "Yes", and advances the processing to step S405. In step S403, in a case where the item is not determined to be the text string determined as the scrolling text target (NO in step S403), the processing proceeds to step S405.

In step S405, the CPU 102 checks the scrolling text determination flag "ScrollLine". If the scrolling text determination flag "ScrollLine" is "Yes" (YES in step S405), the processing proceeds to step S406. In step S406, the CPU 102 starts the scrolling text display of the text string displayed on the display unit. In a case where the scrolling text determination flag "ScrollLine" is "No" (NO in step S405), the CPU 102 advances the processing to step S407 without executing the scrolling text display.

In step S407, the CPU 102 determines whether the positional coordinates provided through the touch panel have been changed. In step S407, in a case where the CPU 102 determines that the positional coordinates have not been changed (NO in step S407), the processing proceeds to step S409. In step S409, the CPU 102 determines whether the user keeps touching the touch panel with his/her finger. In a case where the CPU 102 determines that the item is still being touched and pressed with the finger (YES in step S409), the processing returns to step S405. Thereafter, in step S406, the CPU 102 continues to execute the scrolling text display. On the other hand, in step S409, in a case where the CPU 102 determines that the user has tapped out, that is, removed his/her finger from the item (NO in step S409), the processing proceeds to step S410. In step S410, the CPU 102 shifts the display to the next screen assigned to the item.

In step S407, in a case where the CPU 102 determines that the positional coordinates have been changed (YES in step S407), the processing proceeds to step S408. In step S408, the CPU 102 determines whether the positional coordinates correspond to the item. In a case where the positional coordinates correspond to the item (YES in step S408), the CPU 102 advances the processing to step S409 and executes the above-described processing. On the other hand, in step S408, in a case where the CPU 102 determines that the positional coordinates do not correspond to the item (NO in step S408), the CPU 102 determines that a selection of the item has been cancelled, and advances the processing to step S411. In step S411, the CPU 102 checks the scrolling text determination flag "ScrollLine". In a case where the scrolling text determination flag "ScrollLine" is "Yes" (YES in step S411), the processing proceeds to step S412. In step S412, the CPU 102 ends the scrolling text display and the focus display. In a case where the scrolling text determination flag "ScrollLine" is "No" (NO in step S411), the CPU 102 ends the focus display of the item to end the processing.

As described above, according to the present exemplary embodiment, for a specific item which corresponds to a text string exceeding the number of characters displayable at a time, the scrolling text display is executed while the user is touching the specific item, and thus the user can select the item after checking the contents thereof. Furthermore, after checking the contents, if the user finds out that the item is not a desired one, the user can cancel a selection of the item by moving his/her finger to a region outside the item without removing his/her finger from the touched plane. Therefore, the entire portion of the required text string can be displayed without degrading the usability of the touch panel.

In the first exemplary embodiment, a description has been given to the processing for executing the scrolling text display while the item corresponding to the text string determined as a scrolling text target is being touched. In a second exemplary embodiment, a description will be given to the processing for changing a scroll speed of the scrolling text display by executing a drag operation. More specifically, a description will be given to the processing for accelerating and decelerating the scroll speed by dragging the finger that touches the text string determined as a scrolling text target in a left direction and a right direction, respectively.

Figure 5:
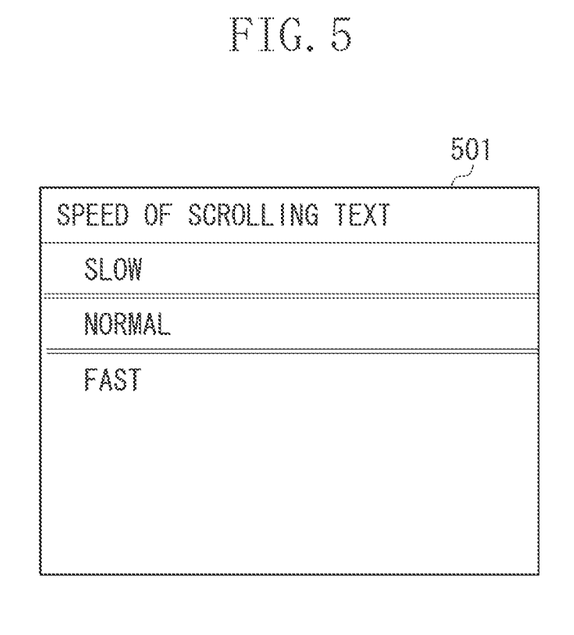
FIG. 5 is a diagram illustrating a setting screen of a scroll speed for scrolling text display according to a second exemplary embodiment of the present disclosure.

FIG. 5 is a diagram illustrating a screen for setting a default value of the scroll speed of the scrolling text. The scroll speed has three levels, "slow", "normal", and "fast". FIG. 5 illustrates a state where "normal" is set as the default value. As an internal status of the image forming apparatus 100, the levels "slow", "normal", and "fast" are represented by "1", "2", and "3", respectively.

Figure 6:
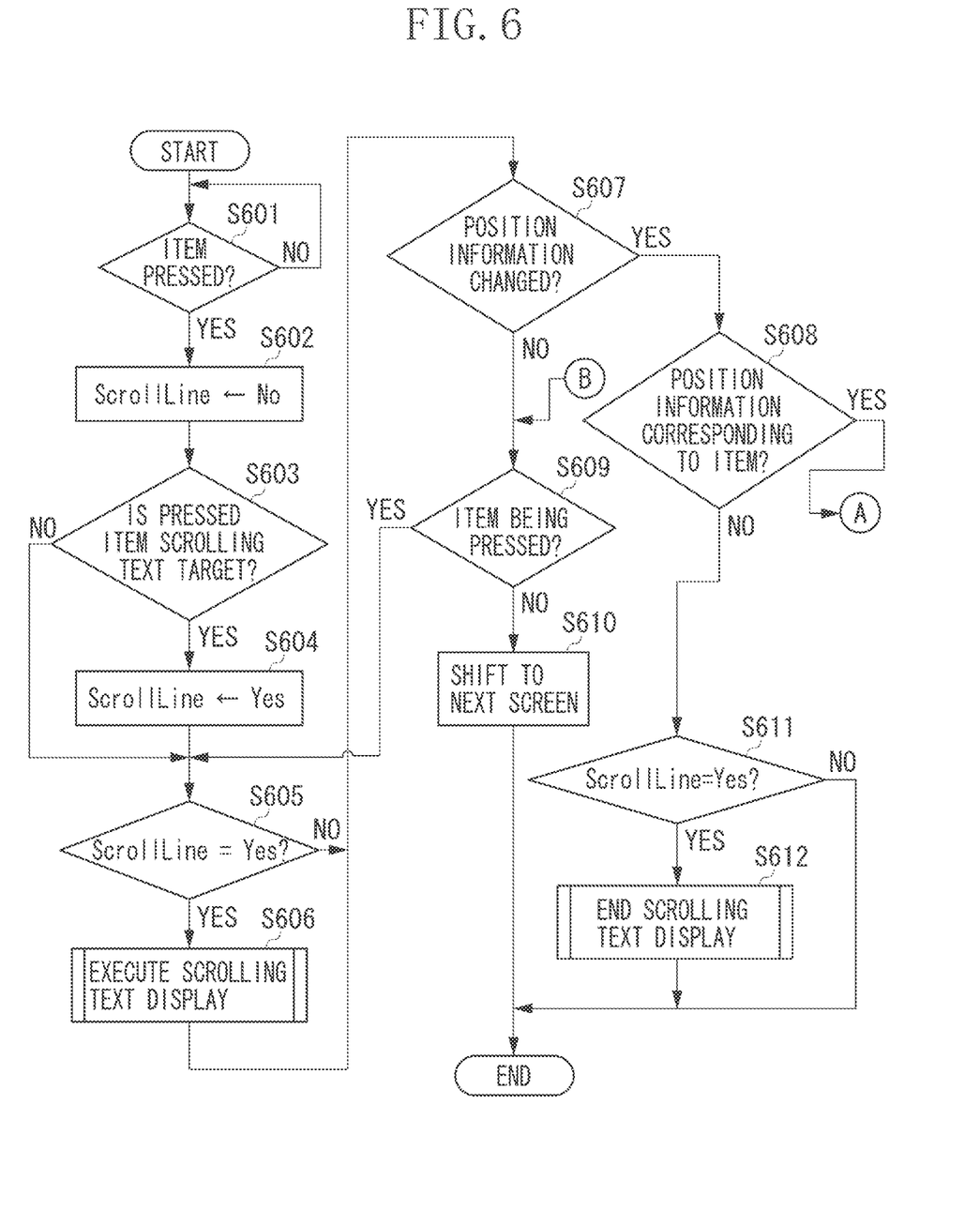
FIG. 6 is a flowchart according to the second exemplary embodiment of the present disclosure.
Figure 7:
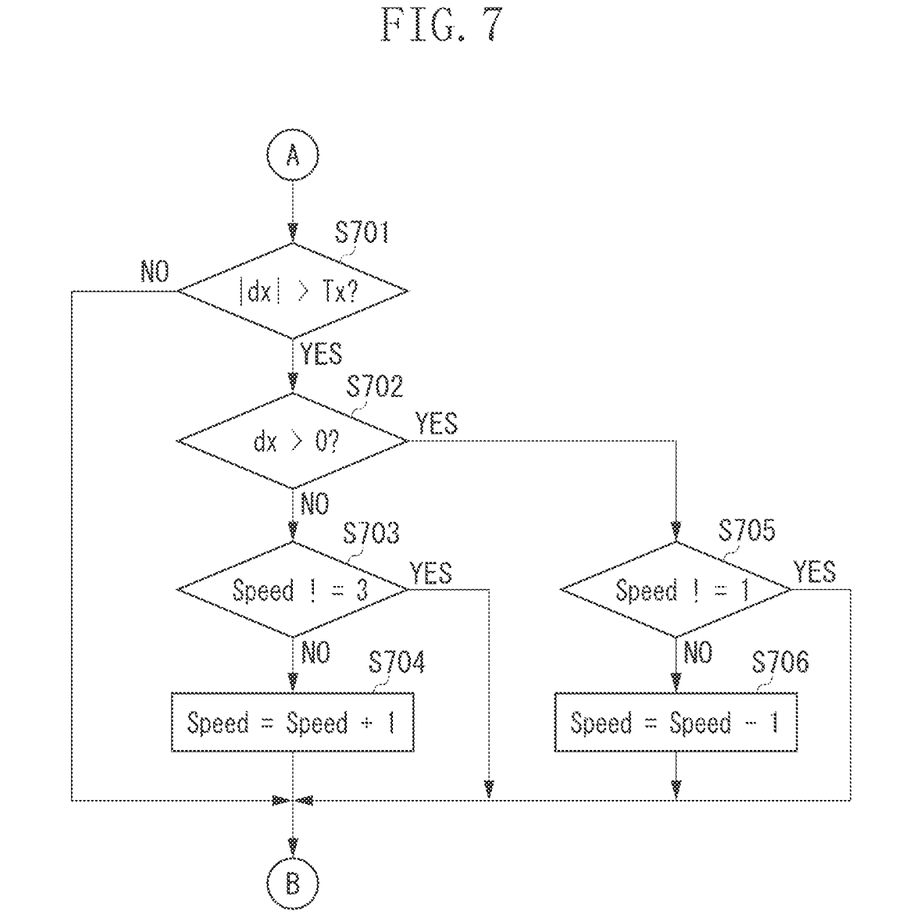
FIG. 7 is a flowchart according to the second exemplary embodiment of the present disclosure.

FIGS. 6 and 7 are flowcharts illustrating the processing executed by the CPU 102 according to the present exemplary embodiment. Only the processing to be executed when a determination result acquired in step S608 is "YES" is different from that of FIG. 4, and the rest of the processing is the same as that of FIG. 4. Therefore, the processing different from that of FIG. 4 will be mainly described.

In a case where the CPU 102 determines that the positional coordinates provided through the touch panel have been changed (YES in step S607), and further determines that the changed positional coordinates still correspond to the item (YES in step S608), the CPU 102 advances the processing to step S701. In step S701, the CPU 102 determines whether a moving amount in an X-direction exceeds a threshold value. Herein, "dx" represents the moving amount in the X-direction, and |dx| represents an absolute value of the moving amount. "Tx" represents the threshold value of the moving amount and is specified in the image forming apparatus 100 in advance. In step S701, in a case where the moving amount in the X-direction is less than the threshold value (NO in step S701), the CPU 102 advances the processing to step S609 without changing the scroll speed.

In step S701, in a case where the moving amount in the X-direction is greater than the threshold value (YES in step S701), the processing proceeds to step S702. In step S702, the CPU 102 determines whether the moving direction is leftward or rightward. The moving direction is determined to be leftward if a value of the moving amount in the X-direction is negative, whereas the moving direction is determined to be rightward if the value is positive. In a case where the CPU 102 determines that the moving direction is leftward (NO in step S702), the processing proceeds to step S703. In step S703, the CPU 102 determines whether the current scroll speed is set to "3", or "fast". In a case where the scroll speed is "3" (YES in step S703), the CPU 102 advances the processing to step S609 without changing the scroll speed. In a case where the scroll speed is not "3" (NO in step S703), the processing proceeds to step S704. In step S704, the CPU 102 increases the scroll speed by one-level, and advances the processing to step S609. In step S702, in a case where the CPU 102 determines that the moving direction is rightward (YES in step S702), the processing proceeds to step S705. In step S705, the CPU 102 determines whether the current scroll speed is set to "1", or "slow". In a case where the scroll speed is "1" (YES in step S705), the CPU 102 advances the processing to step S609 without changing the scroll speed. In a case where the scroll speed is not "1" (NO in step S705), the processing proceeds to step S706. In step S706, the CPU 102 decreases the scroll speed by one-level, and advances the processing to step S609.

After executing the processing illustrated in FIG. 7, in step S609, in a case where the CPU 102 determines that the item is still being touched (YES in step S609), the processing proceeds to steps S605 and S606, so that the CPU 102 executes the scrolling text display at the changed scroll speed.

As described above, according to the present exemplary embodiment, the scroll speed of the scrolling text display can be dynamically changed by moving the touching finger to the right or the left. Further, in the above-described exemplary embodiment, the scroll speed is increased by dragging the finger to the left, whereas the scroll speed is decreased by dragging the finger to the right. Alternatively, the scroll speed may be increased or decreased in an opposite manner.

As described above, according to each of the above-described exemplary embodiments, on a touch panel display that restricts the number of characters displayable at a time, while the user keeps touching a specific item corresponding to a text string exceeding the restricted number of characters, the text string is scroll-displayed. Further, the user can select the item being scroll-displayed simply by tapping out. Whereas, the user drags his/her finger to the position of another item while keeping touching the touch panel display if the user finds out that the touched item is not a desired one. Furthermore, because the user can change the scroll speed of the scrolling text display by executing a drag operation within the region of the touched item, the user can intuitively change the scroll speed. Therefore, even if the touch panel is employed for an operation unit having a small-size screen, for example, an operability thereof equivalent to the conventional operability achieved by a cursor can be ensured without degrading the operability of the touch panel.

In addition, in each of the above-described exemplary embodiments, the scrolling text display is started when the CPU 102 detects a tap-in of the item corresponding to a text string determined as a scrolling text target. Alternatively, the scrolling text display may be started when the CPU 102 confirms that the item has been continuously touched for a predetermined time after the detection of a tap-in. In other words, the scrolling text display may be started when the CPU 102 detects a long-tap.

Further, in each of the above-described exemplary embodiments, when the user touches a specific item to execute the scrolling text display thereof and then taps out within the specific item, the CPU 102 determines the specific item as the selected item and shifts the display to the next screen. However, another configuration may be also considered. For example, the CPU 102 may simply end the scrolling text display without shifting the display to the next screen when the CPU 102 has detected a tap-out after executing the scrolling text display. Furthermore, the CPU 102 may display a confirmation message such as "WOULD YOU LIKE TO SELECT THE ITEM?" when the CPU 102 detects a tap-out, and when the user provides an instruction for selecting the item, the CPU 102 may shift the display to the next screen by determining that the item has been selected.

Further, in the above-described exemplary embodiments, the image forming apparatus 100 having a plurality of functions such as a copy function and a scanner function has been described as an example. However, the exemplary embodiments of the present disclosure are also applicable to an image forming apparatus having only a part of the above functions. Furthermore, the exemplary embodiments of the present disclosure may also be applied to other information processing apparatuses such as a personal computer, a personal digital assistance (PDA), a mobile phone, a facsimile, a camera, a video camera, and other image viewers.

According to the exemplary embodiments of the present disclosure, the scrolling text display of a specific item can be executed by the information processing apparatus including a touch panel display.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An informational processing apparatus comprising:
   a touch panel display; and
   a controller including a processor, the controller configured to:
   cause the touch panel display to display a part of a character string within an area, in a case that a number of the character string is larger than a predetermined character limit for displaying in the area at once, wherein the area corresponds to a predetermined process regarding a function designated by the character string;
   cause the touch panel display to display another part of the character string within the area, in response to a touch with an object to the area displayed by the touch panel display;
   when the display of the another part of the character string is within the area, detect that the touch has ended by the object being taken off from the touch panel display;
   in response to the detection that the touch has ended, execute the predetermined process corresponding to the character string; and
   in response to detection that the touch to the area has moved along the surface of the touch panel display out of the area, cause the touch panel display to display the part of the character string within the area without executing the predetermined process corresponding to the character string.

2. The information processing apparatus according to claim 1, wherein the predetermined character limit is a limit of a number of characters that can be displayed per line.

3. The information processing apparatus according to claim 1, wherein the controller scrolls the character string so as to display said another part of the character string.

4. The information processing apparatus according to claim 3, wherein the controller scrolls the character string continuously until the object moves to the surface of the touch panel display out of the area.

5. The information processing apparatus according to claim 1, wherein the controller detects the touch with the object and taking off the object.

6. The information processing apparatus according to claim 1, wherein the controller selects the character string based on detecting the touch on the displayed part of the character string.

7. The information processing apparatus according to claim 6, wherein, in a case that the object moves along with the surface of the touch panel display out of the area, the controller cancels selection of the character string.

8. The information processing apparatus according to claim 1, wherein the controller causes the touch panel to display said another part of the character string even if the object moves along to the surface of the touch panel display inside the area.

9. The information processing apparatus according to claim 1, wherein, in response to detecting the touch on the displayed part of the character string, the controller causes the touch panel display to display said another part of the character string without moving the object.

10. The information processing apparatus according to claim 1, wherein the area corresponds to an item included in a list displayed on the touch panel display.

11. The information processing apparatus according to claim 1, wherein the predetermined process is a process for displaying a display item corresponding to the character string.

12. The information processing apparatus according to claim 1, wherein the predetermined process is a process for displaying a screen for setting regarding facsimile.

13. The information processing apparatus according to claim 1, wherein the controller is further configured to:
   select the character string in a case that the object touches the area displayed by the touch panel display; and
   cancel a selected state of the character string in a case that the object moves along the surface of the touch panel display out of the area.

14. An information processing method for controlling an information processing apparatus having a touch panel display comprising:
   causing the touch panel display to display a part of a character string within an area, in a case that a number of the character string is larger than a predetermined character limit for displaying in the area at once, wherein the area corresponds to a predetermined process regarding a function designated by the character string;
   causing the touch panel display to display another part of the character string within the area, in response to a touch with an object to the area displayed by the touch panel display;
   when the display of the another part of the character string is within the area, detect that the touch has ended by the object being taken off from the touch panel display;
   in response to the detection that the touch has ended, executing the predetermined process corresponding to the character string; and
   in response to detection that the touch to the area has moved along the surface of the touch panel display out of the area, causing the touch panel display to display the part of the character string within the area without executing the predetermined process corresponding to the character string.

15. The information processing method according to claim 14, wherein the predetermined character limit is a limit of a number of characters that can be displayed per line.

16. The information processing method according to claim 14, wherein the predetermined process is a process for displaying a display item corresponding to the character string.

17. A non-transitory storage medium storing a control method for controlling an information processing apparatus having a touch panel display, the control method comprising:

causing the touch panel display to display a part of a character string within an area, in a case that a number of the character string is larger than a predetermined character limit for displaying in the area at once, wherein the area corresponds to a predetermined process regarding a function designated by the character string;

causing the touch panel display to display another part of the character string within the area, in response to a touch with an object to the area displayed by the touch panel display;

when the display of the another part of the character string is within the area, detect that the touch has ended by the object being taken off from the touch panel display;

in response to the detection that the touch has ended, executing the predetermined process corresponding to the character string; and in response to detection that the touch to the area has moved along the surface of the touch panel display out of the area, causing the touch panel display to display the part of the character string within the area without executing the predetermined process corresponding to the character string.

\* \* \* \* \*